United States Patent
Grundner et al.

(10) Patent No.: US 8,843,878 B1
(45) Date of Patent: Sep. 23, 2014

(54) QUALITY SOFTWARE DEVELOPMENT PROCESS

(71) Applicant: FMR LLC, Boston, MA (US)

(72) Inventors: James A. Grundner, Cary, NC (US); Deborah A. Walsh, Holly Springs, NC (US); Lynne H. Hayes, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/204,194

(22) Filed: Mar. 11, 2014

(51) Int. Cl.
   *G06F 9/44* (2006.01)
(52) U.S. Cl.
   CPC ........................................ *G06F 8/77* (2013.01)
   USPC ............................ 717/101; 717/102; 717/124
(58) Field of Classification Search
   CPC ....................................................... G06Q 10/06
   USPC ................................ 717/101–113, 124–135
   See application file for complete search history.

(56) References Cited

U.S. PATENT DOCUMENTS

| | | | |
|---|---|---|---|
| 5,731,991 A * | 3/1998 | Kinra et al. ................... | 702/186 |
| 7,742,939 B1 * | 6/2010 | Pham ........................... | 705/7.39 |
| 2004/0243968 A1 * | 12/2004 | Hecksel ........................ | 717/100 |
| 2006/0161879 A1 * | 7/2006 | Lubrecht et al. .............. | 717/101 |
| 2013/0311968 A1 * | 11/2013 | Sharma ........................ | 717/101 |

OTHER PUBLICATIONS von Wangenheim, Christiane Gresse, Alessandra Anacleto, and Clenio F. Salviano. "Helping small companies assess software processes." Software, IEEE 23.1 (2006): pp. 91-98.*
Greer, Des, and Günther Ruhe. "Software release planning: an evolutionary and iterative approach." Information and Software Technology 46.4 (2004): pp. 243-253.*
Lehman, Manny M. "Feedback in the software evolution process." Information and Software technology 38.11 (1996): pp. 681-686.*

* cited by examiner

*Primary Examiner* — Satish Rampuria
(74) *Attorney, Agent, or Firm* — Gesmer Updegrove LLP

(57) ABSTRACT

A method of performing a software development process that includes performing a release execution process that analyzes a software code and stores relevant information associated with the software code. Also, the method includes executing a continuous improvement process that is executing on a computer platform. The continuous improvement process receives the relevant information and computes a plurality of relevant scores to measure the likelihood of success of a software development project. Furthermore, the method includes performing a product planning process that utilizes the relevant scores to assess the viability of the software development project.

18 Claims, 2 Drawing Sheets

QUALITY SOFTWARE DEVELOPMENT PROCESS

BACKGROUND OF THE INVENTION

The invention is related to the field of software development, and in particular to streamline processes surrounding software development and to improve the quality.

From its beginnings in the 1940s, writing software has evolved into a profession concerned with how best to maximize the quality of software and of how to create it. Quality can refer to how maintainable software is, to its stability, speed, usability, testability, readability, size, cost, security, and number of flaws or "bugs", as well as to less measurable qualities like elegance, conciseness, and customer satisfaction, among many other attributes. How best to create high quality software is a separate and controversial problem covering software design principles, so-called "best practices" for writing code, as well as broader management issues such as optimal team size, process, how best to deliver software on time and as quickly as possible, work-place "culture," hiring practices, and so forth.

With the expanding demand for software in many smaller organizations, the need for inexpensive software solutions led to the growth of simpler, faster methodologies that developed running software, from requirements to deployment, quicker & easier. The use of rapid-prototyping evolved to entire lightweight methodologies, such as Extreme Programming (XP), which attempted to simplify many areas of software engineering, including requirements gathering and reliability testing for the growing, vast number of small software systems. Very large software systems still used heavily-documented methodologies, with many volumes in the documentation set; however, smaller systems have a simpler, faster alternative approach to managing the development and maintenance of software calculations and algorithms, information storage/retrieval and display.

These approaches have become overtime very complex and burdensome and the invention addresses a novel technique to address these issues.

SUMMARY OF THE INVENTION

According to one aspect of the invention, there is provided a method of performing a software development process. The method includes performing a release execution process that analyzes a software code and stores relevant information associated with the software code. Also, the method includes executing a continuous improvement process that is executing on a computer platform. The continuous improvement process receives the relevant information and computes a plurality of relevant scores to measure the likelihood of success of a software development project. Furthermore, the method includes performing a product planning process that utilizes the relevant scores to assess the viability of the software development project.

According to another aspect of the invention, there is provided a method for optimally selecting a software development effort. The method includes providing the software code associated with one or more software development projects. Also, the method includes performing a release execution process that analyzes the software code and storing relevant information associated with the software code. A continuous improvement process is executing on a computer platform. The continuous improvement process receives the relevant information and computes a plurality of relevant scores to measure the likelihood of success of the one or more software development projects. Furthermore, the method includes performing a product planning process that utilizes the relevant scores to assess and select the most viable of the one or more software projects for release.

DETAILED DESCRIPTION OF THE INVENTION

The invention involves a novel way of improving the overall quality of software development. Through the use of this invention, one is able to streamline processes surrounding software development and to improve the quality in a way that would not be attainable through pure human analysis and execution.

Software development is a complicated process with many factors playing a role in the potential outcome in terms of quality. The invention uses a machine based process for reviewing the following inputs:

- Level of effort score (composite of skills needed, lessons learned in previous similar efforts, developer quality assessment)
- Skill scores of people that will do the work (knowledge, skills and ability+lessons learned)
- Preferred practices and design efficiency (composite design score)
- Risks identified (risk score) based on at least 5 comparable work efforts The invention uses these factors and computes a selected number of parameters to measure how successful the software development project will be.

Figure 1:
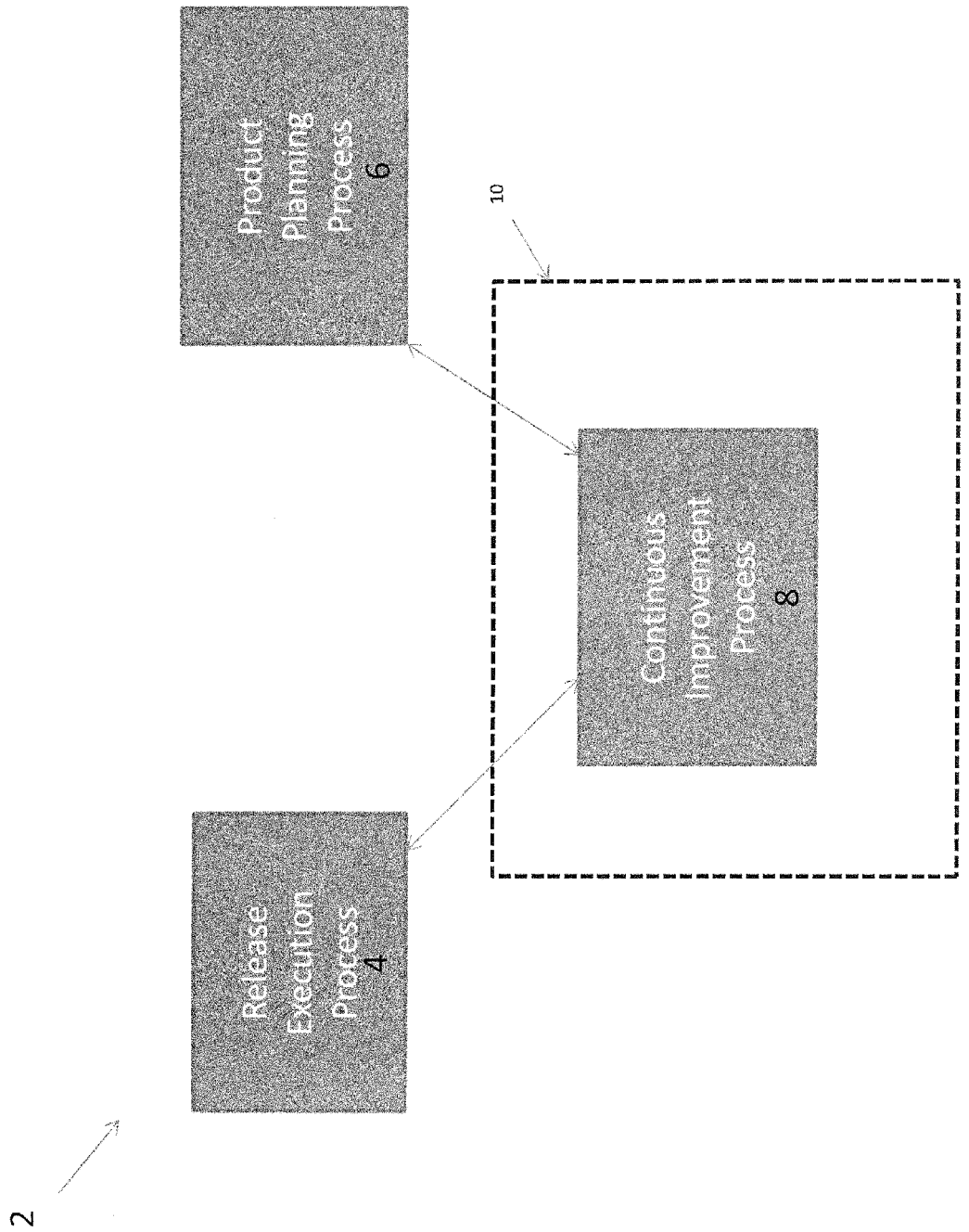
FIG. 1 is a schematic diagram illustrating the software development process.

FIG. 1 is a schematic diagram illustrating the software development process 2. The invention is comprised of distinct processes: human process or product planning process 6, continuous improvement process 8, and release execution process 4. These processes interact with each other in assessing how viable a software development effort will be as well as finding an efficient process in implementing a software development effort. The release execution process 4 is similar to the process of developing software code for a project. This includes developing and reviewing a piece of code, testing, and quality validation of that piece of code. This process requires compiling and assessing the defects in the code. The key component of the invention lies in the continuous improvement process 8 that provides relevant scores that aid in implementing the best execution strategy for the overall software development process.

The continuous improvement process 8 performs a number of machine-based calculations to determine the strategy to implement a software development process. In particular, the continuous improvement process 8 calculates a development readiness and experience score to assess a development team's readiness in tackling a software development project. Moreover, the continuous improvement process 8 calculates scores regarding the level of effort as well as scores on preferred practices and design efficiency. These scores are provided to the product planning process 6. It is important to note that the continuous improvement process 8 is a machine-based process or application that is executed on a computer system or platform 10.

The product planning process 6 uses the scores described above to develop a time based estimate, risk assessment & mitigation strategy, and development approach that can achieve the best and highest quality outcome. The product planning process 6 usually includes a team deciding how to best implement an optimal software development effort. The team uses the scores calculated by the continuous improvement process 8 to determine the types of skills needed to effectively proceed with a software development project.

The result of the invention is that a team of software developers can achieve higher quality software development based on the analysis and recommendation of the innovative software development process than they would have been able to achieve on their own. The software development process continues to learn based on continually adding new processes, approaches and efforts to its database repository thereby improving the calculations for future work efforts on that expanded database knowledge.

The invention continues to feed the database repository with information through the lessons learned multiplier and into the composite readiness score. This requires comparing completed projects to new projects as well assessing similarities between projects in terms of skills, effort, software languages, number of people involved as well as number of technology groups involved.

The invention performs numerous calculations that provide recommendations on process, approach and overall achievability, and other relevant factors. The project is then commenced. At the end of the project, a result is achieved. One can load that result back into the lessons learned database which is then used for future projects. In this way, as one has more projects with more dimensions and attributes, the system is able to give better advice based on more data and combinations that are stored for future project reference.

Figure 2:
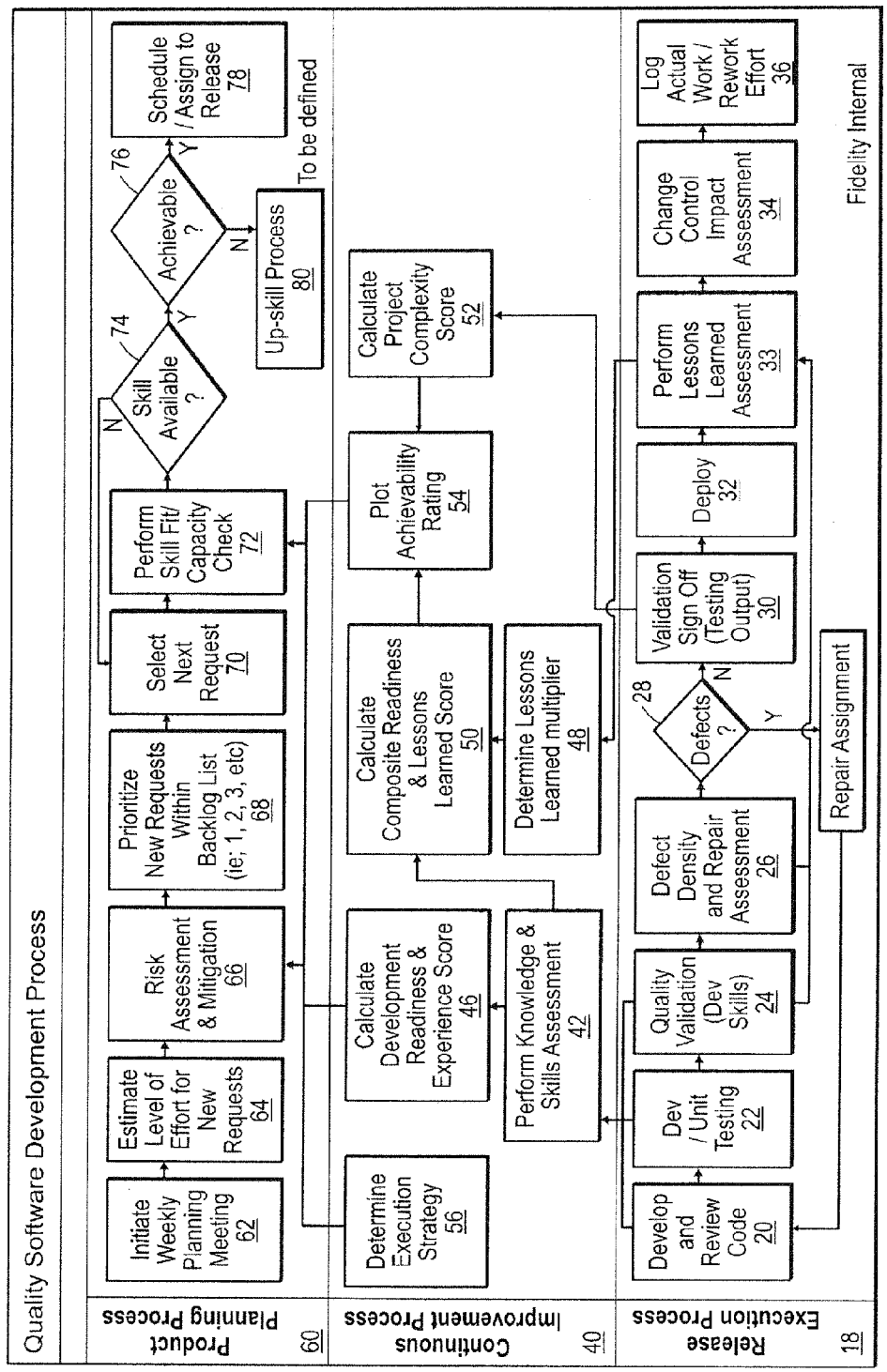
FIG. 2 is a process flow illustrating the interconnection between various processes used in accordance with the invention.

FIG. 2 is a process flow illustrating the interconnection between various processes used in accordance with the invention. The release execution process includes the initial steps in the software development process. A team member or developer develops code and reviews the code, as show in step 20. Afterwards, the developer tests the code, as shown in step 22, and validates the quality of the piece of code, as shown in step 24. The developer analyzes the defect density and repair assessment, as shown in step 24, and determines if there are any major defects, as shown in step 26. If there are major defects, shown in step 28 and a repair assignment is done, as shown in step 29, steps 20 and 24 is repeated. If there are no major defects the developer signs off on the validation, as shown in step 30. Moreover, the developer deploys the software code, as shown in step 32, and performs lessons learned assessment, as shown 33. The lesson learned assessment includes storing design and coding practices that have been used successfully in previous work output in a practices and design database. This includes storing results from steps 22 and 24 discussed above. Afterwards, the developer assesses the impact of change control, as shown in step 36, and logs the actual work for later retrieval, as shown in step 36.

The continuous improvement process 40 is machine base or computer-based process that is either executing on a processor of some kind either on a server or a local computer. The continuous improvement process 40 performs a knowledge and skills assessment of the parties involved, as shown in step 42. The knowledge and skills assessment compares the relative strengths and weaknesses of the development team members and includes weighted scores for knowledge skills, current skills, skills required, system analyst project experience, developer project experience, test project experience, and project manager project experience. The continuous improvement process uses the knowledge and skills assessment weighted scores to compute a score for development readiness and experience (DRE) score, as shown in step 46. The following equation defines the DRE:

$$DRE = DKS + (DCS/DSR)*(SAPE + DPE + TPE + PMPE) \quad \text{Eq. 1}$$

where DKS is a knowledge score, DCS is current skills, DSR is skills required, SAPE is systems analyst project experience, DPE is developer project experience, TPE is test project experience, and PMPE is project manager project experience.

The continuous improvement process 40 determines and computes weighted scores for lesson learned, as shown in step 48. The continuous improvement process 40 accesses the practices and design database to assign a weighted score called applied lessons learned multiplier to calculate the composite readiness and lesson learned score, as shown in step 50. Moreover, the continuous improvement process 40 calculates a composite readiness & lesson learned (CRLL) score using the following relation:

$$CRLL = (SAPE(3)*DPE(2)*TPE(2)*PMPE(4)*APE(5))*\text{applied lessons learned multiplier} \quad \text{Eq. 2}$$

The continuous improvement process 40 also calculates the project complexity score, as shown in step 52. The project complexity score requires information associated with the validation signoff step 30. The project complexity score is computed with the following equation:

$$\text{project complexity} = (\text{cross organization multiplier})*(\text{\# of interfaces})*(\text{\# of technologies})*(\text{\# of project teams})*(\text{cross project dependency and sequencing})*(\text{domain knowledge})*(\text{geographic disbursement}) \quad \text{Eq. 3}$$

where the cross organization multiplier, cross project dependency and sequencing, domain knowledge, and geographic disbursement are assigned values calculated from information provided in step 30. The continuous improvement process 40 calculates a plot accessibility rating using the complexity score and CRLL score, as shown in step 54. In addition, the continuous improvement process 40 calculates an execution strategy score, as shown in step 56. The execution strategy score is defined as the following:

$$\text{execution strategy} = \text{applied methodology success}*\text{project complexity} \quad \text{Eq. 4}$$

where the variable applied methodology success is a weighted factor associated with completion time.

The product planning process 60 includes weekly planning meeting, as shown in step 62, where estimates regarding the level of effort are determined regarding a software development effort, as shown in step 64. The product planning process must also perform a risk assessment and mitigation with respect to a software development effort, as shown in step 66. This requires acquiring execution strategy score of step 56, development readiness and experience score of step 46, and plot achievability rating of step 54. Based on the scores mentioned, a risk assessment and mitigation strategy is formed.

Moreover, new requests are prioritized within a backlog list, as show in step 68. A next request is selected, as shown in step 70, and a skill/fit capacity check is performed to determine if the right skills of team members are in place for the software development effort to proceed, as shown in step 72. A determination is made as to whether team member's skills are within the standards required, as shown in step 74. If the skills are not within the standard required step 70 is repeated for selecting the next request, otherwise a determination as to whether the software development effort is achievable, as shown in step 76. If the software development effort is deemed achievable then the effort is scheduled/assigned to release, as shown in step 78. Otherwise, the software development effort is further evaluated if more skills are needed, as shown in step 80.

The invention is targeted at improving the overall quality of software development. Through the use of this invention, one is able to streamline processes surrounding software development and to improve the quality in a way that would not be attainable through pure human analysis and execution. The invention produces and utilizes calculated scores that help determine whether the software development team is comprised of members having the necessary skills to get the job done as well as implementing a risk assessment and mitigation plan involving this effort. This streamlines the traditionally complicated task of managing software development projects removing the guesswork and providing a clear objective plan on how to proceed with a software development effort.

Although the present invention has been shown and described with respect to several preferred embodiments thereof, various changes, omissions and additions to the form and detail thereof, may be made therein, without departing from the spirit and scope of the invention.

What is claimed is:

1. A method of performing a software development process comprising:
   performing a release execution process that analyzes a software code and stores relevant information associated with the software code, wherein the relevant information includes developing and reviewing a piece of the software code, testing, and quality validation of the piece of the software code;
   executing by a processor a continuous improvement process that executes on a computer platform, the continuous improvement process receives the relevant information and computes a plurality of relevant scores to measure the likelihood of success of a software development project, wherein the relevant scores comprise a level of effort score defining composite of skills needed, lessons learned in previous similar efforts, and developer quality assessment; and
   performing a product planning process that utilizes the relevant scores to assess the viability of the software development project.

2. The method of claim 1, wherein the computer platform comprises a server or local computer.

3. The method of claim 1, wherein the relevant scores comprise a skill score defining knowledge, skills, ability, lessons learned of the people working on a software development project.

4. The method of claim 1, wherein the relevant scores comprise a composite design score defining the preferred practices and design efficiency.

5. The method of claim 4, wherein the relevant scores comprise a risk score that relies on past comparable work efforts.

6. The method of claim 5, wherein the relevant scores comprise a project complexity score defining the level of difficulty of a software development project.

7. The method of claim 6, wherein the relevant scores comprise an execution strategy score that defines the best strategy to proceed with the software development.

8. The method of claim 6, wherein the project complexity score and composite design score is used to calculate the risk score.

9. The method of claim 6, wherein the project complexity score is used to calculate the execution strategy score.

10. A method for optimally selecting a software development effort comprising:
    providing the software code associated with one or more software development projects;
    performing a release execution process that analyzes the software code and storing relevant information associated with the software code, wherein the relevant information includes developing and reviewing a piece of the software code, testing, and quality validation of the piece of the software code;
    executing by a processor a continuous improvement process on a computer platform, the continuous improvement process receives the relevant information and computes a plurality of relevant scores to measure the likelihood of success of the one or more software development projects, wherein the relevant scores comprise a level of effort score defining composite of skills needed, lessons learned in previous similar efforts, and developer quality assessment; and
    performing a product planning process that utilizes the relevant scores to assess and select the most viable of the one or more software development projects for release.

11. The method of claim 10, wherein the computer platform comprises a server or local computer.

12. The method of claim 10, wherein the relevant scores comprise a skill score defining knowledge, skills, ability, lessons learned of the people working on a software development project.

13. The method of claim 10, wherein the relevant scores comprise a composite design score defining the preferred practices and design efficiency.

14. The method of claim 13, wherein the relevant scores comprise a risk score that relies on past comparable work efforts.

15. The method of claim 14, wherein the relevant scores comprise a project complexity score defining the level of difficulty of a software development project.

16. The method of claim 15, wherein the relevant scores comprise an execution strategy score that defines the best strategy to proceed with the software development.

17. The method of claim 15, wherein the project complexity score and composite design score is used to calculate the risk score.

18. The method of claim 15, wherein the project complexity score is used to calculate the execution strategy score.

* * * * *